United States Patent [19]
Kulberg et al.

[11] Patent Number: 5,850,612
[45] Date of Patent: Dec. 15, 1998

[54] MULTI-AXIS VERTICALLY CORRECTED ANTENNA FOR HANDHELD WIRELESS COMMUNICATIONS DEVICES

[75] Inventors: Eric C. Kulberg, San Diego; Stephen B. Tidwell, Carlsbad; Roy H. Davis, San Diego, all of Calif.; Roy K. Fischer, Scottsdale, Ariz.; Randall R. Toltzman, Scottsdale, Ariz.; Randsom A. Brown, Scottsdale, Ariz.

[73] Assignee: QUALCOMM Incorporated, San Diego, Calif.

[21] Appl. No.: 538,562

[22] Filed: Oct. 3, 1995

[51] Int. Cl.⁶ ..................................................... H04B 1/38
[52] U.S. Cl. ........................... 455/550; 455/575; 455/90; 343/882
[58] Field of Search ................................ 455/89, 90, 351, 455/347, 550, 557, 575, 121; 343/702, 882, 906

[56] References Cited

U.S. PATENT DOCUMENTS

| | | |
|---|---|---|
| 5,218,370 | 6/1993 | Blaese ...................... 343/702 |
| 5,313,663 | 5/1994 | Norris ...................... 455/351 |
| 5,513,383 | 4/1996 | Tsao ......................... 455/90 |
| 5,535,435 | 7/1996 | Balzano et al. ........... 455/90 |
| 5,535,439 | 7/1996 | Katz .......................... 455/90 |
| 5,559,522 | 9/1996 | Seitz ........................ 343/702 |

FOREIGN PATENT DOCUMENTS

| | | | |
|---|---|---|---|
| 611199 | 8/1994 | European Pat. Off. ............. 455/89 |
| 2702324 | 9/1994 | France ................................. 455/89 |

*Primary Examiner*—Reinhard J. Eisenzopf
*Assistant Examiner*—Lester G. Kincaid
*Attorney, Agent, or Firm*—Russell B. Miller; Gregory D. Ogrod

[57] ABSTRACT

A portable wireless communications device such as a telephone handset having a vertically corrected antenna module pivotally secured to the handset for rotation about a first pivot axis. The antenna module can be rotated into a predetermined orientation, independent of handset orientation. An antenna mounted on the module is oriented vertically when the module is in the predetermined orientation. When the antenna module is rotated for use, a mechanism incorporated in the module support structure automatically rotates the antenna module about a second pivot axis which is substantially perpendicular to the first. This second rotation places the antenna at an angle that compensates for tilting of the handset during use about an axis parallel to the second axis, or along the first. That is, the antenna is shifted by a preselected angle in vertical orientation, typically around 10–15 degrees, in a direction perpendicular to the first direction of rotation to compensate for positioning a speaker and microphone for use.

31 Claims, 13 Drawing Sheets

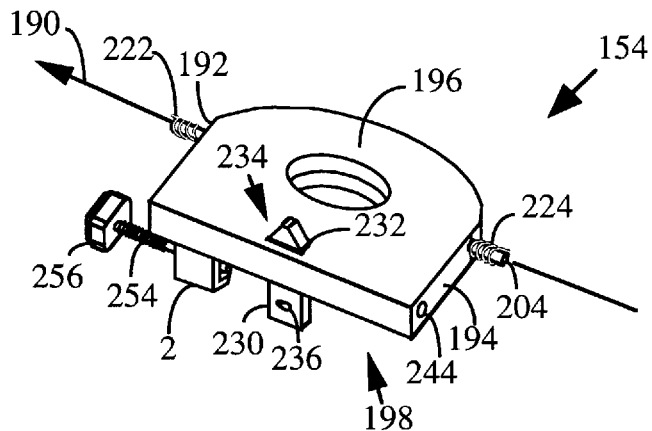
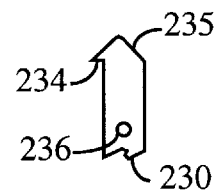
FIG. 16A
FIG. 16B
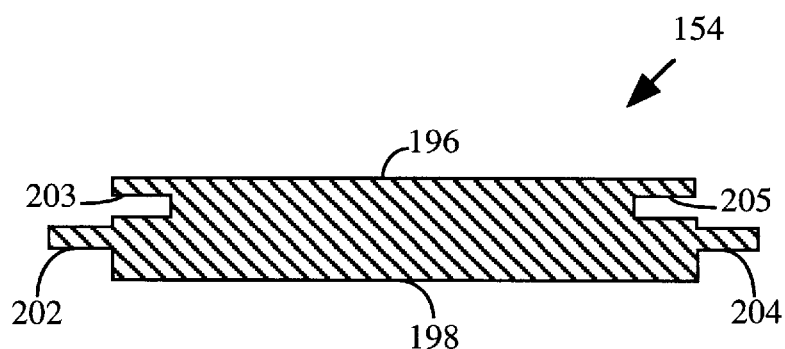
FIG. 17A
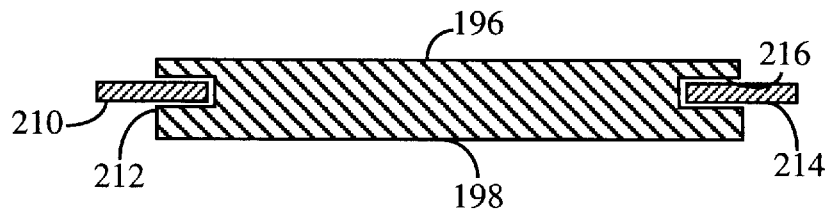
FIG. 17B
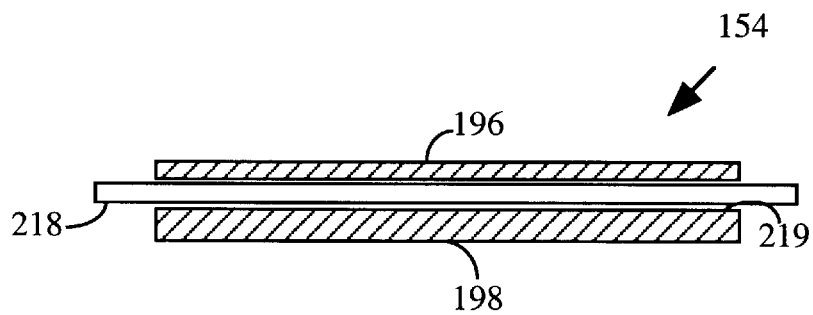
FIG. 17C

MULTI-AXIS VERTICALLY CORRECTED ANTENNA FOR HANDHELD WIRELESS COMMUNICATIONS DEVICES

RELATED APPLICATIONS

This application is related to commonly owned applications Ser. Nos. 08/532,920, filed on Sep. 22, 1995, entitled "Vertically Correcting Antenna For Portable Telephone Handsets" and 08/536,024, filed on September 29, entitled "Magnetically Driven Vertically Correcting Antenna For Portable Telephone Handsets", the full disclosures of which are incorporated herein by reference as if reproduced in full below.

BACKGROUND OF THE INVENTION

I. Field of the Invention

The present invention relates generally to satellite communications and more particularly to portable or handheld telephones used for wireless communications through communication satellites. The invention is further related to a method and apparatus for correcting vertical position of antennas relative to multiple axis to effect more efficient signal transfer.

II. Description of the Related Art

In terrestrial based wireless or cellular telephone systems, communication signals are transferred to and from system users using fixed base stations, also referred to as cell sites, each covering a specific geographical area. In satellite based communication systems, the same signals are transferred between system users and gateways using satellites. Satellites are generally used to provide service over fairly large geographic areas in large scale communication systems that provide communications between widely dispersed fixed and mobile users or subscriber units. Such systems are described, for example, in U.S. Pat. No. 4,901,307, which issued Feb. 13, 1990 under the title "Spread Spectrum Multiple Access Communication System Using Satellite Or Terrestrial Repeaters", and U.S. patent application Ser. No. 08/368,570, filed under the title "Method And Apparatus For Using Full Spectrum Transmitted Power In A Spread Spectrum Communication System For Tracking Individual Recipient Phase Time And Energy," which are both assigned to the assignee of the present invention, and incorporated herein by reference.

Subscriber units using telephone style handsets in such systems typically have transceivers for receiving, processing and transmitting communication signals through an external antenna. The transceivers are suitably linked to a microphone, speaker, visual display unit, and the antenna in a manner well known in the art. The antenna tends to be specialized in terms of both operating frequencies and radiation patterns, and orientation of the antenna can be quite important for proper signal transfer with a satellite.

Antennas used on subscriber units in satellite communication systems should have their respective radiation patterns directed substantially upward from a local horizontal plane or horizon to efficiently couple energy to or from satellites. If a handset is held in an orientation in which the antenna is not vertical, or is rotated to a non-vertical orientation during use, the radiation pattern (local horizon) is also positioned at an angle to the horizon. In this position, communication may be lost or severely degraded as the radiation pattern no longer covers some satellite positions, or aligns a lower energy portion with others, decreasing energy transfer. Depending on the angle of the phone, even communications with satellites at fairly high elevations could suffer.

To compensate for this effect antennas can be designed with radiation patterns that extend below the local antenna horizon. That is, the radiation pattern is adjusted to extend below a horizon for the antenna (phone) so that some off vertical positioning of the phone still places satellites within a desired radiation pattern. Unfortunately, this type of antenna design is less efficient in transferring signal energy even when aligned vertically and positioned optimally with respect to satellite positions. At the same time, disruption of service still results when the phone is rotated sufficiently, unless the radiation pattern extends excessively below the horizon.

These problems are addressed in the related patent applications disclosed and incorporated above, by providing mechanisms which automatically correct vertical orientation of an antenna during telephone use. These mechanisms use gravitational forces to cause an antenna support module to rotate and maintain an antenna in a vertical orientation. However, while those techniques compensate for phone motion about one axis, actual telephone usage involves motion about more than one axis. That is, many telephone handsets have fairly planar front surfaces and shapes which do not conform to user facial features or operating habits. While this is convenient for manufacturability, and ease of storage and transport, it results in a phone handset that is placed at an angle offset from vertical in order to align a speaker with a user's ear and a microphone near the user's mouth. Typically, this offset represents an angle on the order of up to 10 degrees from vertical. This offset means that signal transfer is still impacted as discussed above.

Therefore, a new antenna direction control mechanism is desired that compensates for handset motion or angular offsets about more than one axis during use to maintain a vertical orientation, without undue complexity or interaction from the telephone user.

SUMMARY OF THE INVENTION

It is an object of the present invention to provide a portable or handheld wireless telephone handset with a vertically corrected antenna.

Another object of the invention is to provide vertical orientation adjustments relative to two axis.

An advantage of the invention is that the antenna can more efficiently couple energy with satellite communication links with a minimum of user interaction.

These and other purposes, advantages, and objects are realized in a wireless communications device such as a portable telephone which has a handset with a microphone and speaker mounted along one wall of a handset housing. An antenna module is pivotally secured to one portion of the housing using a pivot joint, for rotation about a first pivot axis. This rotation allows the antenna module to be placed in a predetermined orientation about the first axis during use, independent of handset orientation. An antenna mounted on the antenna module projects along a vertical direction from the module when the module is in the predetermined orientation. The handset can be configured for vertically correcting antenna position either manually or automatically, as desired. A means or mechanism is provided for also positioning or rotating the antenna module about a second pivot axis which is perpendicular to the first, to provide vertical orientation of the antenna along the first axis as well, that is, about the second axis.

In one embodiment, the means for rotating relative to the second pivot axis is realized by mounting the antenna module on a flat support wall on the handset. This support wall may form an inner wall of a recessed area. This mounting is typically accomplished using one of several well known pivoting mechanisms, such as bearings or rotary pins, which is positioned in a central location on the handset wall. The antenna module has a flat inner wall which is placed substantially parallel and adjacent to the housing wall, and has a passage for receiving the pivoting mechanism.

The handset and antenna module inner walls are substantially parallel to each other, but are positioned at a common preselected angle relative to a predefined axis of the handset. The antenna is also positioned with a central axis at a preselected angle to the inner antenna module wall in an inoperative or closed position. The antenna angle is typically the same as the offset angle for the two walls with respect to the handset axis. Therefore, the antenna rests generally parallel to the predefined handset axis in the closed position, although it may be offset from that axis to some degree. A typical predefined handset axis extends between a microphone and a speaker which are each used during handset operation, and represents an axis which is tilted during handset operation to align the speaker and microphone for use. At the same time, the first pivot axis is the same as, or parallel to, an axis about which the handset is rotated during use.

As the antenna module is rotated about the first pivot axis, the offset angles of the two walls are added in part to each other producing an offset angle for the sides of the antenna module relative to the predefined handset axis. When the antenna module is rotated about 180° from a closed position the angle between the central axis of the antenna and the predefined handset axis is the sum of the offset angles for the antenna axis and the walls.

In a preferred embodiment, the offset angle between the handset and antenna module walls is in the range of 5° to 8°, with the antenna central axis being offset or set at an angle by this amount from the inner antenna module wall. This results in a total offset angle of around 10° to 16° when the antenna module is rotated 180° from the closed position, and around 5° to 8° when the antenna module is rotated 90°. Therefore, the antenna is automatically offset or vertically corrected by this angle when the antenna module is rotated to position the antenna for use. This angle, which is selected relative to each device application, counters tilting of the predefined axis.

In another embodiment, the means for rotating relative to the second pivot axis is realized by mounting the antenna module on a flat support plate, which is in turn mounted on the handset using a pivot joint. The antenna module is mounted on the support plate, as before, using one of several known pivoting mechanisms positioned in a central location on the plate. The antenna module has a flat inner wall which is placed substantially parallel and adjacent to the plate, and has a passage for receiving the pivoting mechanism.

The plate and antenna module inner wall are substantially parallel to each other, but the plate can be positioned at one or more preselected angles relative to a predefined axis of the handset. This is accomplished by mounting the plate on the handset using a pivot joint which allows the plate to be rotated between two extreme positions. One position typically has an upper surface of the plate positioned parallel to the predefined axis, and the other has that surface positioned at a desired angle to the predefined axis. The antenna is generally positioned with a central axis parallel to the inner antenna module wall.

Therefore, the antenna rests generally parallel to the predefined handset axis in the closed (starting) position, although it may be offset from that axis to some degree. A typical predefined handset axis extends between a microphone and a speaker which are used during handset operation, and represents an axis which is tilted during handset operation to align the speaker and microphone for use. At the same time, the first pivot axis is the same as, or parallel to, an axis about which the handset is rotated during use.

In further aspects of this embodiment, the support plate is mounted in a recess on the handset using two pivot arms located on opposite sides of the periphery of the plate. Each pivot arm is surrounded by, and supports, a torsional spring which engages the plate on one end and a wall of the recess on the other. The springs apply a rotational force to the plate about an axis defined by the pivot arms. Alternatively, coil or leaf type springs can be mounted between the plate and the handset to bias one side of the plate away from the handset. A latch mechanism secures the plate in a starting or non-offset position when the antenna is not in use, and releases the plate to be moved by the spring force when the antenna is to be used.

Each handset preferably comprises a generally rectangular housing having a front wall in which the microphone and speaker are located, and rear, upper, lower, and spaced apart side walls. The front wall may also have a keypad and a visual display unit. Antenna modules are preferably pivotally mounted on the rear wall of the housing, and a recess may be provided in the rear wall adjacent to an upper end of the housing for mounting the antenna module. Antenna modules are preferably shaped to fit into the recess with outer surfaces substantially flush with adjacent surfaces of the housing when the antenna is rotated into an inoperative, stored, position adjacent to or within the general outline of the handset. A recess may also be provided for receiving the antenna in a stored position. In further aspects of the invention, a release mechanism is used to release the antenna from storage within the recess.

The wireless device may be designed for satellite communications only, or may be usable in other wireless applications such as in conventional cellular systems, and may have an additional, built-in cellular antenna.

The pivotal mounting of the antenna insures that the antenna can be vertically oriented regardless of actual handset orientation, reducing the risk of signal loss as a result of improper antenna orientation. The handset user does not have to orient the antenna about the second pivot axis, but the antenna module rotates into a proper vertical orientation along the first axis and about the second under the influence of either the offset mounting surfaces, or spring loaded support platform. Thus, the antenna is maintained in a more optimal, vertical orientation for acceptable antenna reception and transmission. At the same time, due to the assurance of a reasonably vertical orientation for an antenna mounted according to the invention, the radiation pattern of the antenna can be optimized to have a more vertical pattern with more efficient signal energy transfer or coupling, improving communications.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which:

FIG. 16(a) illustrates an enlarged view of a pivot plate assembly for use in the handset of FIG. 10; and FIG. 16(b) illustrates a pivot latch used in the assembly of FIG. 16(a);

FIGS. 17(a), 17(b), and 17(c) illustrate alternative pivot plate and arm assemblies useful in the assembly of FIG. 16;

DESCRIPTION OF THE PREFERRED EMBODIMENT

The present invention is a technique for orienting an antenna on a portable wireless communications device vertically during use to improve the transfer of signal energy with satellite repeaters and gateway type base stations. The invention also allows improved radiation pattern tailoring for the antenna, which further improves communication system performance.

The invention achieves these functions by securing an antenna or antenna structure on an antenna module which is rotatably mounted on a rear wall of the communications device. The module is rotatable about a first pivot axis to various positions which direct the antenna vertically during device usage. When the antenna module is rotated for use, a mechanism incorporated in the module support structure automatically rotates the antenna module about a second pivot axis which is substantially perpendicular to the first. This second rotation places the antenna at an angle that compensates for rotation of the handset during use about an axis that is parallel to the second axis. That is, the antenna is shifted by about 10–15 degrees in its vertical orientation in a direction perpendicular to the first direction of rotation to compensate for positioning a speaker and microphone for use.

Figure 1:
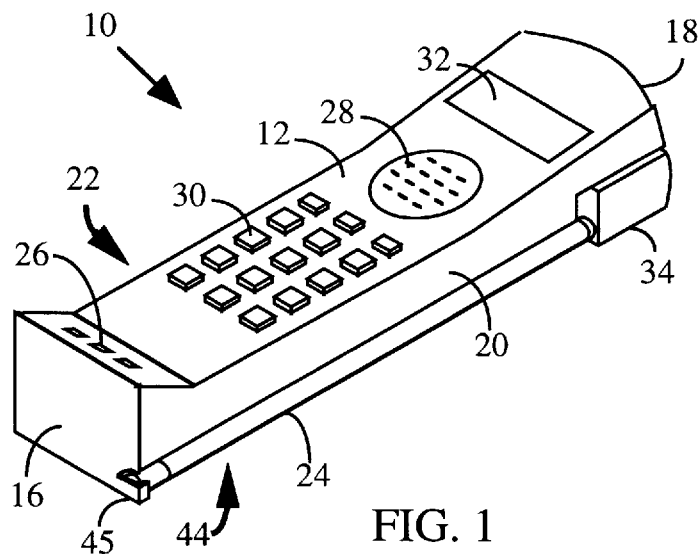
FIG. 1 illustrates a front perspective view of a wireless telephone handset according to a preferred embodiment of the invention, with a pivoting antenna in a closed position.
Figure 2:
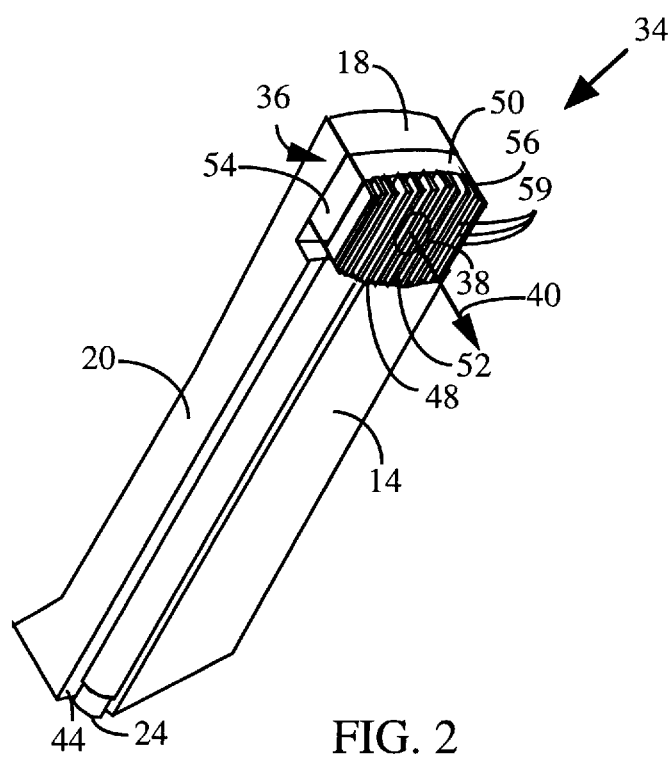
FIG. 2 illustrates a rear perspective view of the handset of FIG. 1.

A wireless communications device in the form of a portable or handheld telephone constructed and operating according to the principles of the present invention is shown beginning in FIGS. 1 and 2. In FIGS. 1 and 2, a portable telephone or phone handset 10 is illustrated having a housing with front and rear walls 12 and 14, respectively, along with lower, upper, and side walls 16, 18, 20, and 22. An antenna 24 pivotally mounted on rear wall 14 of the phone is shown stowed in a closed or inoperative position within an elongated recess 44 along the juncture of rear and side walls 14 and 20.

Antenna 24 is any one of a number of antennas which are useful in satellite communication systems, such as, but not limited to, quadrifilar or octafilar helix antennas. Antenna structures for use in such systems generally need to operate at least two frequencies. It is preferable to utilize a small or compact antenna design in phone 10, so compact designs such as octafilar antennas are preferred. Such antennas are discussed further in U.S. patent applications Ser. Nos. 08/513,317 and 08/532,921 entitled "Quadrifilar Helix Antenna And Feed Network" and "Dual-Band Octafilar Helix Antenna", respectfully, which are incorporated herein by reference. However, those skilled in the art will also recognize that for some applications, such as where stacked antennas are employed, a telescoping antenna or antenna radome can be used. Antenna 24 is illustrated as having a telescoping upper body inserted into a lower housing.

Telephone handset 10 comprises a generally rectangular housing, manufactured from relatively lightweight materials known in the art, such as a lightweight plastic. The radome used to manufacture antenna 24 is generally manufactured from similar lightweight materials. Typically, one or more ergonomic and stylish design features in terms of shape and surface depressions are employed on the various surfaces and walls of the handset, as would be known in the art.

For example, a portion of a front wall surface may extend outward toward a user where a microphone 26 is mounted to improve voice pick-up, and surface extensions or depressions may be used to hold a speaker 28 in an upper portion of front wall 12 of the handset. Such features are illustrated in FIG. 1, along with a conventional keypad and keys 30 and visual display unit 32 used for information input and display, respectively. Speaker 28 is mounted on the front wall, which is generally held against or near a user's ear during use. However, the invention functions equally well when the telephone is rested on a surface well removed from the user's ear.

Figure 3:
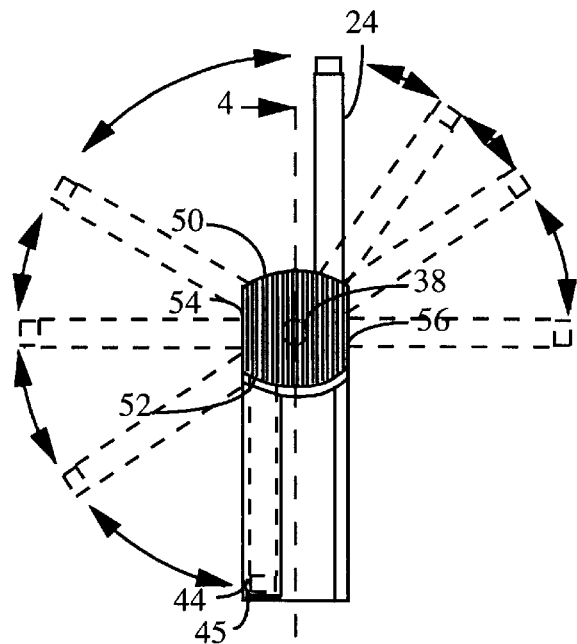
FIG. 3 illustrates a rear view of the handset of FIG. 1 showing different vertical antenna orientations.
Figure 4:
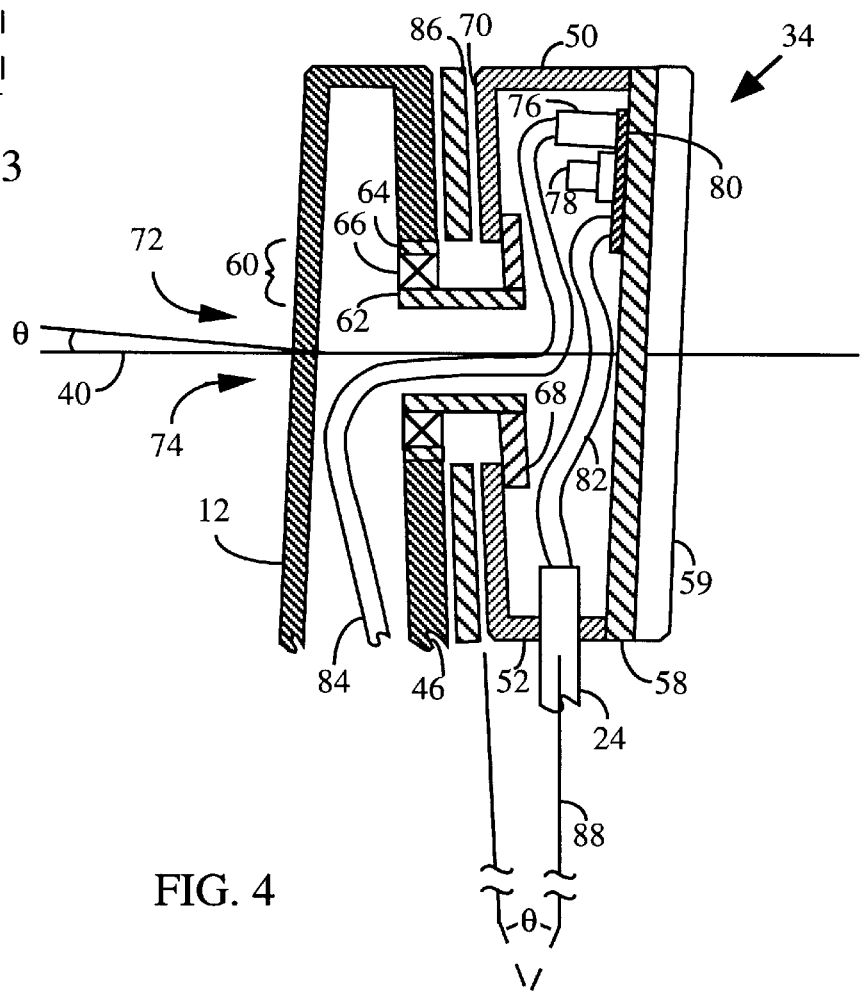
FIG. 4 illustrates an enlarged sectional view taken on line 4—4 of FIG. 3.
Figure 5:
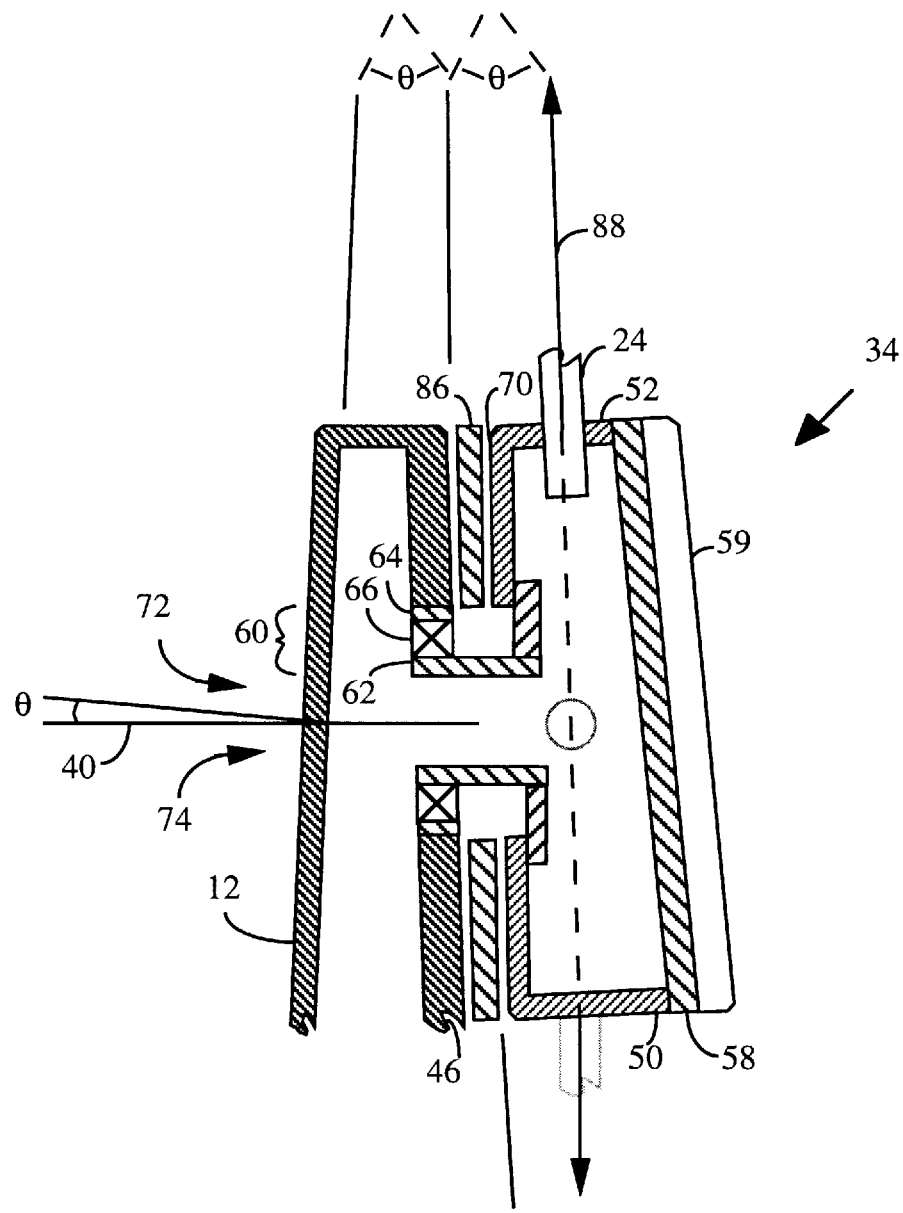
FIG. 5 illustrates the sectional view of FIG. 4, with the antenna module rotated by 180°.

The mounting of antenna 24 on rear surface 14, is shown in the rear view of FIGS. 2 and 3, with further details presented in FIGS. 4 and 5. In FIGS. 2 and 3, antenna 24 is shown mounted on an antenna module 34 which is pivotally mounted in a recess 36 in rear wall 14 of the phone handset using a pivot joint 38. Pivot joint 38 defines a pivot axis 40 which extends generally perpendicular to rear wall 14 or to a predefined handset axis extending through the speaker and microphone, as discussed further below. The housing has an elongated recess 44 extending along one side or edge of rear wall 14 for receiving antenna 24, or a radome containing antenna elements, when not in use. A suitable releasable snap or latching device is provided for releasably holding the antenna in recess 44. For example, a snap lock finger or latch 45 is shown at the lower end of recess 44. However, a ball and socket type of detent mechanism, or other mechanisms known in the art, may be provided.

Figure 8:
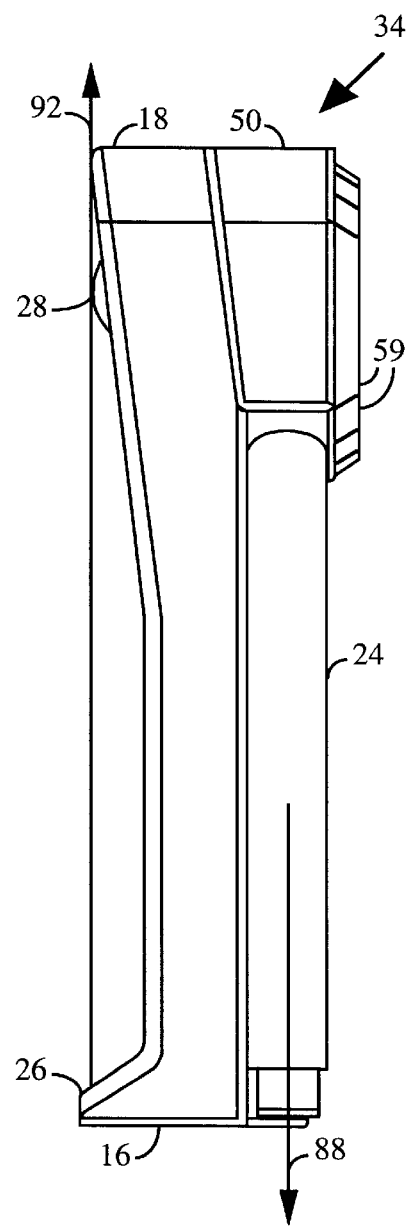
FIG. 8 illustrates a side view of the handset of FIG. 1 with the antenna in a closed position.

The shape and dimensions of recess 36 substantially match those of antenna module 34, so that in a closed, inoperative, position as shown in FIGS. 1, 2, and 8, module 34 is substantially flush with the adjacent surfaces of the handset. In the illustrated embodiment, recess 36 is generally circular in shape with a flat inner wall 46 (FIG. 4) and a curved lower wall 48, but does not use side or upper walls, instead being flush with walls 18, 20, and 22. However, such other walls could be used with wall 46 being more recessed into rear wall 14, as desired. In this embodiment, wall 48 is circular with a height that may decrease adjacent to side walls 20 and 22. Upper wall 18 of the handset is of similar circular shape to lower wall 48 of the recess.

As stated above, antenna module 34 and recess 36 are of substantially matching shape and dimensions. Any shape may be selected which permits antenna module 34 to pivot freely about pivot axis 40 when the antenna is not retained in elongated recess 44. However, the shape of antenna module 34 is preferably selected such that it matches the shape of adjacent surfaces of the phone housing for aesthetics. In this example, antenna module 34 is generally circular in shape with upper and lower circular side walls 50 and 52, curved to approximately match the curve of upper wall 18 or lower recess wall 48, and having straight side walls 54 and 56 which align with side walls 20 and 22. In addition, in some applications such as described below, the profile of antenna module 34, such as that of outer wall 58, is generally adjusted to be as thin as possible, especially toward outer edges, so that it extends very little above the general lines of rear handset surface 14. Criteria or techniques for choosing and using specific shapes in designing a phone are generally well understood by designers in the telecommunication arts.

The walls of the antenna module are typically manufactured from relatively lightweight materials known in the art, similar to those used for manufacturing handset 12. In the exemplary embodiment, outer wall 58 of module 14 has a plurality of parallel, heat dissipating fins 59, as illustrated in FIG. 2. Fins 59 may be manufactured from a suitable metal having improved heat dissipating properties, such as aluminum or the like, or may be of the same plastic material as typically used to manufacture the remainder of the antenna module. Antenna 16 is secured to the lower wall 52 of the antenna module using known techniques, such as but not limited to, press fitting, using adhesive compounds, set screws, retaining rings, or threaded surfaces.

As shown best in FIGS. 2 and 4, antenna support module 34 is mounted on flat wall 46 on the back, or bottom, of recess 36 using a pivot joint 38. Pivot joint 38 includes a pivot member, pin, or bearing assembly secured approximately in the center of wall 46. Such structures are well known in the art and chosen based on manufacturing requirements, cost, loading, and other known factors. For purposes of illustration, pivot joint 38 is shown in FIG. 4 using a bearing assembly 60, with an inner race 62, outer race 64, and bearing 66.

Antenna module 34 has a flat inner wall 70 joined to, or formed as part of, walls 50, 52, 54, and 56. Inner wall 70 is positioned adjacent to wall 46 with a centrally located opening 72 for rotatable engagement over the pivot joint or bearing assembly 60. Bearing assembly 60 is mounted on flat inner wall 46 using known techniques such as, but not limited to, press fitting, or a flange and screw assembly. Inner cylindrical support wall or race 62 extends outward from inner wall 46 and is shown with a flange 68 for securing to antenna module 14. This is accomplished for example using small screws extending through flange 68 into wall 70. Alternatively, other flange and screw arrangements, a variety of adhesives, potting compounds, or retaining rings, clips, and detents can be used to secure the antenna module on race 62, as would be apparent to those skilled in the art. An external damping member such as a fibrous pad (not shown) pressing against the races could also be used for damping, as desired.

An inner passage or bore 74 of bearing assembly 60 provides a passage between the inside of antenna module 34 and the main body of the handset, where various conventional or known electronic components used to manufacture a portable telephone are located. Preferably, some electronic components used in the handset are mounted within antenna module 34, rather than in the handset. In the illustrated embodiment, RF components 76 and 78, which form parts of known circuits, are shown being mounted on a circuit board 80 within antenna module 34. Antenna 24 is connected to these components through a coaxial cable 82, and the RF components are in turn connected by coaxial cable 84 extending through bore 74 to other components in the handset.

An annular shaped pad, ring, or washer 86 of material is disposed between antenna module 34 and wall 46 of recess 36. This material comprises any of a variety of well known low surface friction or self lubricating materials which provide support to antenna module 34 while presenting a low friction surface for rotation. At the same time, this material can be chosen to help damp the motion of antenna module 34. In addition, a detent mechanism for establishing definitive positions for the antenna, can be used between walls 46 and 70, as also discussed below.

With the type of mounting disclosed above, antenna module 34 can rotate freely providing an ability to correct or adjust the antenna vertical orientation about one axis of rotation, 40. That is, a handset user can rotate the antenna to a desired vertical position for use, which improves communications. Various positions for antenna 24 relative to handset 12 are shown in the rear view of FIG. 3. Typically, antenna 24 need not rotate any farther than shown on the right side of FIG. 3, and a stop mechanism (not shown) may be used to prevent further clockwise rotation. Detents or a detent mechanism, discussed below, may be used to set the various positions.

When used in combination with other elements such as counterweights or magnetic actuator and driver mechanisms, this vertical correction can be provided automatically. However, in many applications it is also desirable to accommodate vertical correction of antenna position about a second axis. The mounting structure used for antenna module 34 in the present invention provides for such correction.

Antenna module 34 is mounted in recess 36 in a manner that also provides for rotation about a second pivot axis that is perpendicular to first pivot axis 40, allowing vertical antenna alignment about two axis. This is accomplished by tailoring the shape of the interface between antenna module 34 and wall 46. The mating surfaces used in this interface structure are positioned parallel to each other but at preselected common angles to a predefined handset axis, or exterior walls, when the antenna module is rotated to a closed position. In other antenna positions, the slanted surfaces interact to produce an offset about the second axis. This is shown in more detail in FIGS. 4–6.

Figure 7:
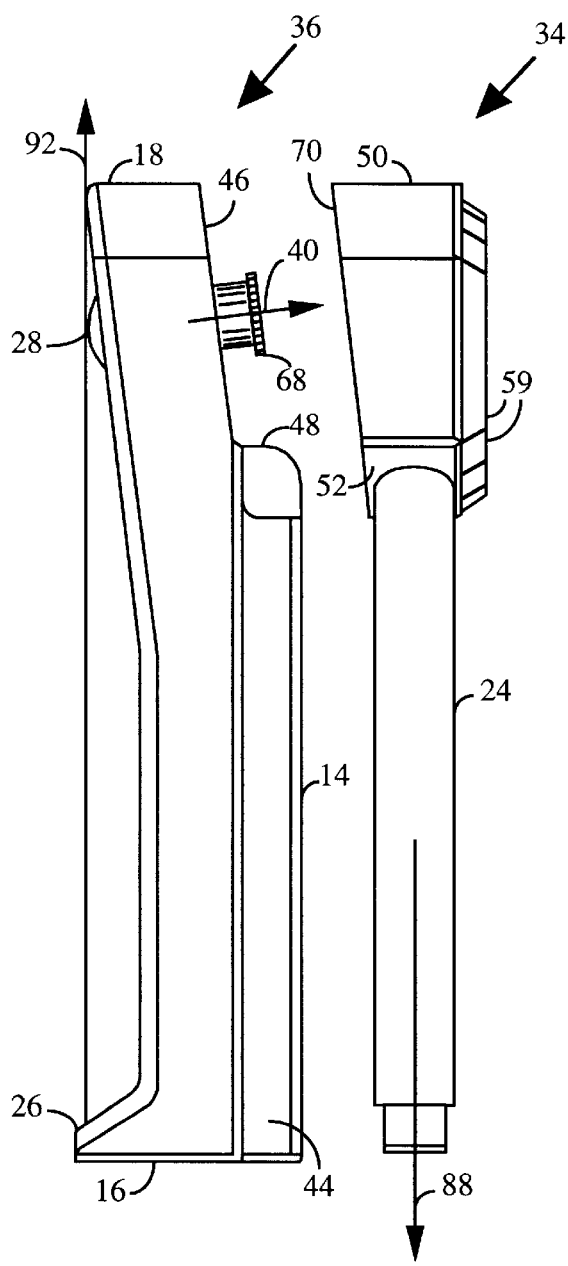
FIG. 7 illustrates a side view of the handset of FIG. 1 with the antenna module and antenna separated from the handset housing.
Figure 9:
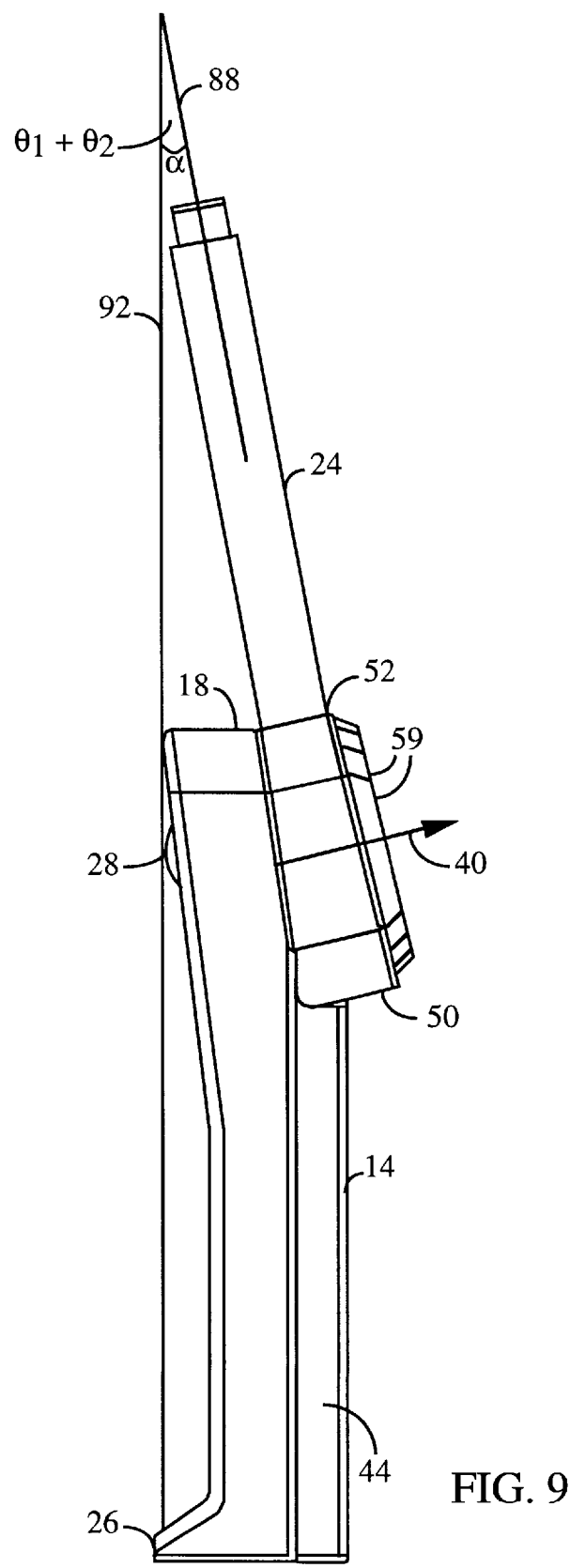
FIG. 9 illustrates a side view of the handset of FIG. 1 with the antenna in an open position.

Returning to FIG. 4, wall 46 is not disposed parallel to front wall 12 but is slanted so that it is positioned closer to front wall 12 near top wall 18 than near recess wall 48. This results in an offset angle θ between wall 46 and wall 12. This is shown in FIG. 4 as the angle between wall 12 and axis 40, which is perpendicular to wall 46. Front wall 12 is used only for illustration purposes in FIG. 4, and wall 46 could be positioned parallel to front wall 12 but offset at an angle with respect to any other surface or axis projected through handset 10, especially where front wall 12 itself has an angled or varying shape, as shown in FIG. 1. The main function of this slant or offset angle is to compensate for rotation or tilting of the handset when placing a speaker and microphone in appropriate positions for use. Therefore, an axis extending through those two components, as shown in FIGS. 7 to 9, generally represents an axis from which wall 46 is offset at an angle. At the same time, wall 70 of antenna module 34 is positioned parallel to wall 46, and slants at the same relative angle between upper and lower module walls 50 and 52, making the module appear thicker on one side, 50, opposite antenna 24.

The actual dimensions of antenna module 34 and relative angle of side walls 50 and 52 to inner wall 70 are not restricted to the relationship shown, but could obtain a variety of positions and dimensions. These angles are determined by the desire to have the antenna module walls positioned flush with the handset walls and provide a profile that does not extend beyond back wall 14, but this is not a requirement of the invention. In using the invention, it is important only that a central axis 88 of antenna 24 be offset at an angle in relation to wall 70, which is typically the same as the offset between wall 46 and the first surface or predefined axis. However, this is done for convenience in positioning the antenna parallel to the handset within recess 44 when closed, but if recess 44 is also positioned at an angle along the back of the handset, then antenna 24 can assume a different angle in relation to wall 70, than that used to establish the position of wall 46. That is, the angle used to position central axis 88 of antenna 24 relative to wall 70 is determined in part by the rest angle desired for antenna 24, parallel to wall 14 or not, when the antenna module is rotated to a closed position. For purposes of discussion only, the slant or offset angle between wall 70 and central axis 88 is treated as being the same as for walls 46 and 12.

As shown in FIG. 4, since both walls 46 and 70 are substantially parallel to each other, any offset angle between these walls and a preselected vertical axis of the handset (or speaker/microphone axis), is cancelled out for antenna 24 in the closed position within recess 44. That is, while the angle of wall 46 would offset antenna 24 from rear wall of handset 10, the matching angle on wall 70 compensates and aligns central axis 88 of antenna 24 parallel to rear wall 14 within recess 44. However, as antenna module 34 is rotated, wall 70 no longer counteracts the offset imparted by wall 46. Instead, the angles of the two walls begin to add together during rotation to produce an even larger offset for antenna axis 88.

Figure 6A:
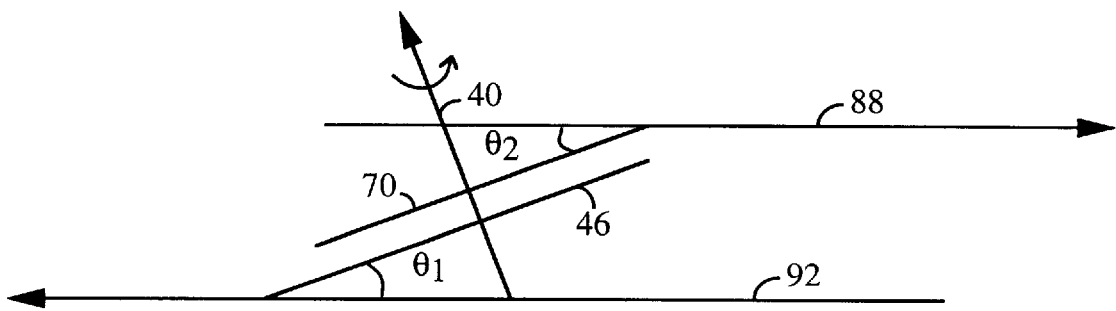
FIGS. 6(a) and 6(b) provide pictorial representations of axis and angles involved in FIGS. 4 and 5.

The affect of the offset angles or slants on walls 40 and 70 discussed above are seen in relation to the illustration of FIG. 5. In a closed position with an antenna module rotation of 0°, as seen in FIGS. 4 and 6(a), the relative angle of offset for walls 46 and 70 with respect to a predefined handset axis (discussed above) is θ and the relative offset angle for antenna 24 central axis 88 is 0°. When antenna module 34 is rotated about 180°, positioning antenna 24 directly above wall 18, the relative offset angle for antenna 24 central axis 88 is 2θ, the sum of both wall offsets. For any position in between these two, the resulting relative offset angle is 2θ times the ratio of the rotation angle to 180°. Those skilled in the art will readily understand how to extend this to rotations beyond 180°. This results in the base of antenna 24, which can be viewed as antenna module 34, rotating about a second pivot axis 90 that runs between side walls 20 and 22 and parallel with the interface between walls 46 and 70. This second pivot axis is substantially perpendicular to the first pivot axis, 40, described above.

Figure 6B:
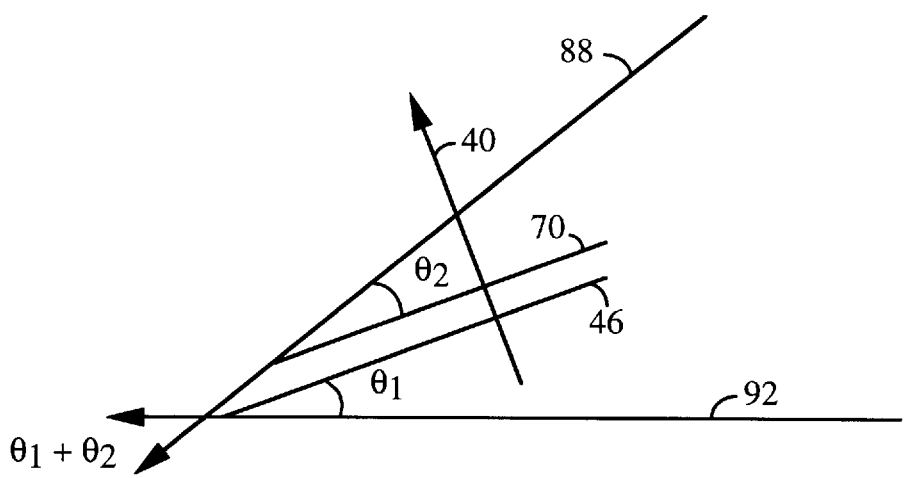

The interaction of the axis and angles for walls 40 and 70 are illustrated pictorially in FIGS. 6(a) and 6(b) without the extra structure of the antenna module and components. In FIGS. 6(a) and 6(b), the two lines labeled 40 and 70 represent parallel walls 40 and 70, while line 88 is the central axis of the antenna and line 40 represents the first pivot axis for the antenna module. Lower line 92 represents the predefined axis extending through or along handset 10 from which it is desired to offset antenna 24. In FIG. 6(a), axis 88 is positioned parallel to predefined axis 92 and walls 40 and 70 are offset at an angle $\theta_1$ with respect to the predefined axis. At the same time, antenna axis 88 is projected at an angle $\theta_2$ with respect to wall 70. Generally, $\theta_1$ equals $\theta_2$, although not required, and the antenna axis is parallel to the predefined axis. As the antenna module is rotated 180°, the configuration shown in FIG. 6(b) is obtained. Note that walls 40 and 70 are now reversed with respect to each other, noted by the end points A and B, but are still parallel and offset at angle $\theta_1$ with respect to predefined axis 92. However, antenna axis 88 is now offset by the total angle $\theta_1+\theta_2$ with respect to predefined axis 92.

The alignment and interaction of antenna 24, antenna module 34, and axis 92 are also shown in the exterior side views of FIGS. 7, 8, and 9. In FIGS. 7, 8, and 9, handset 10 is shown in a partially disassembled state, a closed position, and an open position, respectively. In FIG. 7, antenna module 34 is positioned next to the main handset housing with interior walls 40 and 70 aligned parallel to each other, and axis 88 of antenna 24 aligned with axis 92 and rear wall 14. Once the antenna module is mounted on flange 68, or similar pivot structure, handset 10 is configured in a closed position as shown in FIG. 8. In FIG. 8, antenna 24 rests in recess 44 and is aligned with rear wall 14 and axis 92. When antenna module 34 is rotated about 180°, the antenna is positioned relative to the handset as shown in FIG. 9 with antenna axis 88 positioned at an angle α to axis 92, which is equal to $\theta_1+\theta_2$. However, those skilled in the art will readily appreciate that axis 92 is shown for purposes of illustrating a predefined handset axis, and other axis, such as a central axis of the housing, can be used for selecting an appropriate antenna orientation, as desired.

A preferred offset angle $\theta_1$ for walls 40 and 70 is in the range of 5° to 7° which provides an offset angle of around 10° to 14° when antenna module 34 is rotated 180° from the closed position. The offset becomes around 5° to 7° degrees when the antenna module is only rotated 90° to extend antenna 24 out to one side of the handset. A more typical position for use of handset 10 is a rotation closer to about 135°, or 225°, which results in an offset of about 7.5° to 11.5°, which is a desired range. However, those skilled in the art will readily recognize that the offsets or offset angles can be chosen according to historical use of the given handset or the handset design, and the teachings of the invention apply to a variety of such angles. In some applications, it could even be possible to select wall angles or use spacers or wedge shaped spacing material between the walls during manufacture or assembly to change the offset according to actual usage.

An alternative technique for providing vertical correction of antenna orientation along a second axis is presented in FIGS. 10–20. Here a second portable or handheld telephone constructed and operating according to the principles of the invention is shown having a phone handset 110, as before, with front and rear walls 112 and 114, respectively, along with lower, upper, and side walls 116, 118, 120, and 122. An antenna 124 is pivotally mounted on rear wall 114 projecting generally upward over the top of the handset. As stated above, antenna 124 is any one of a number of antennas found useful for satellite communication systems, such as, an octafilar helix antenna.

Figure 10:
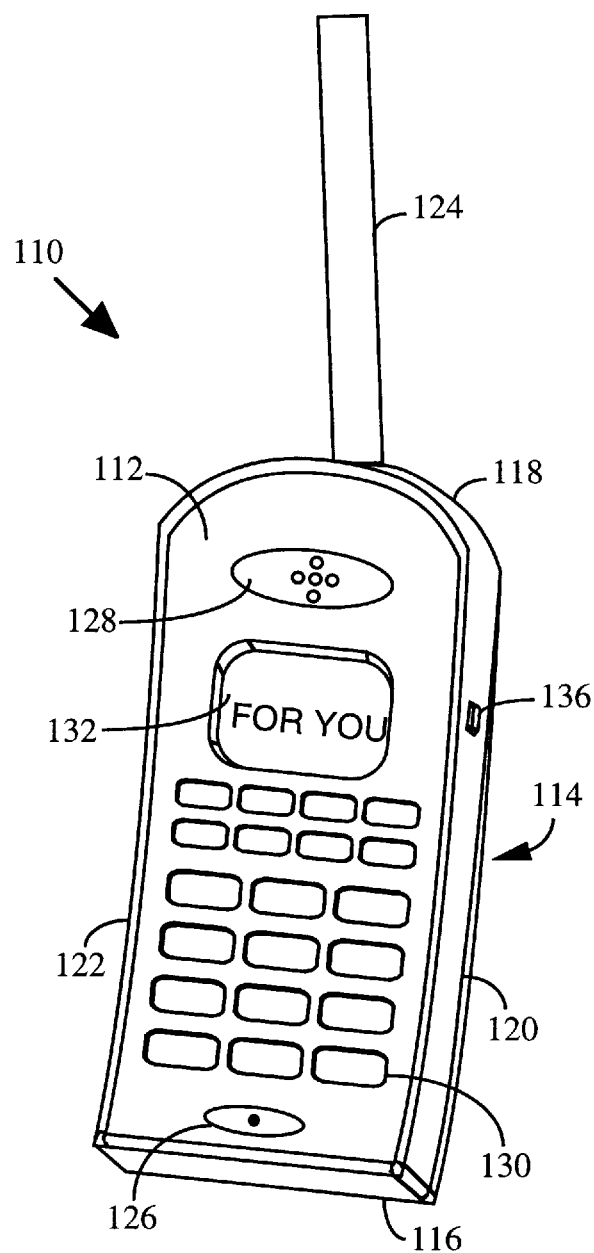
FIG. 10 illustrates a perspective view of a wireless telephone handset according to a second preferred embodiment of the invention, with a pivoting antenna in an open position.

Telephone handset 110 comprises a generally rectangular housing, manufactured from relatively lightweight materials known in the art with one or more ergonomic or stylish design features employed on the various surfaces and walls of the handset. This is shown in FIGS. 10–16 where handset 110 has highly shaped and tapered corners and edges. Typically, a portion of the front wall extends outward to support a microphone 126, and surface extensions or depressions may be used to hold a speaker 128 in an upper portion of front wall 112 of the handset. Such features are illustrated in FIG. 10, along with a conventional keypad and keys 130 and visual display unit 132.

Figure 11:
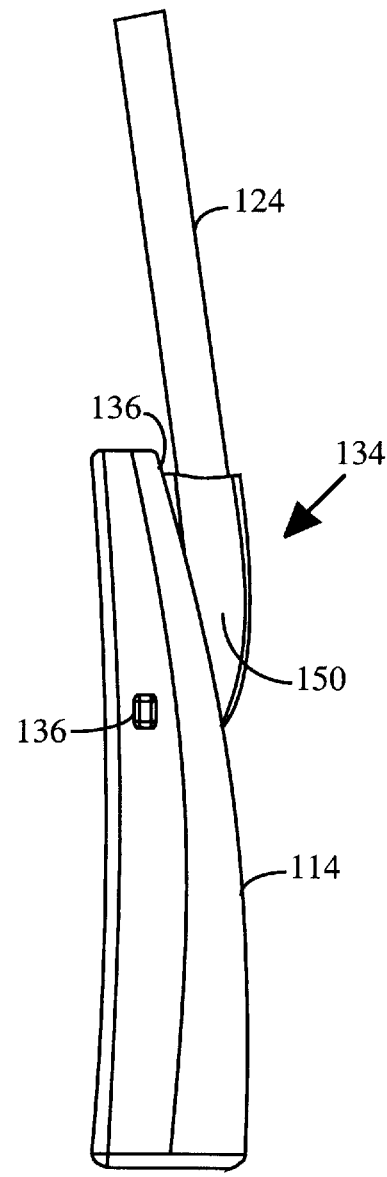
FIG. 11 illustrates a side view of the handset of FIG. 10.
Figure 12:
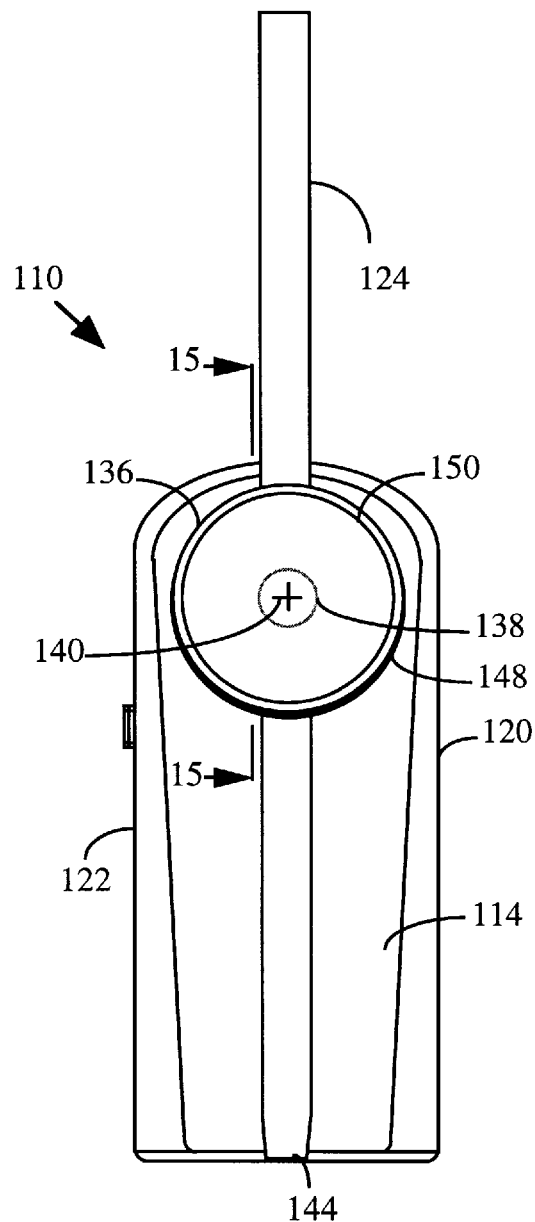
FIG. 12 illustrates a rear view of the handset of FIG. 10.

The mounting of antenna 124 on rear surface 114, is shown in the rear view of FIG. 12 and side views of FIGS. 11 and 20(a)–20(c). In FIGS. 11 and 12, antenna 124 is shown mounted on an antenna module 134 which is pivotally mounted in a recess 136 in rear wall 114 using a pivot joint 138 which defines a pivot axis 140 extending transverse to either rear wall 114 or generally perpendicular to a predefined axis extending through the speaker and microphone, as discussed further below.

Figure 20A:
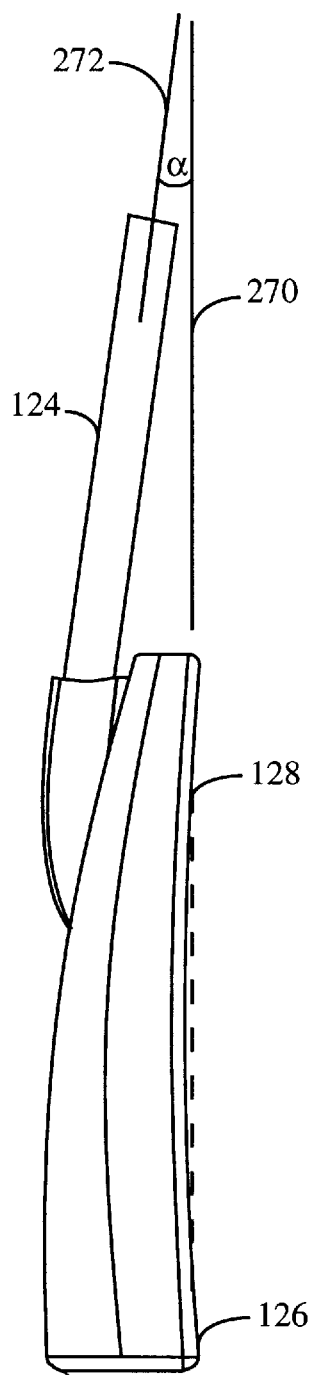
FIGS. 20(a), 20(b), and 20(c) illustrate a side view of the handset of FIG. 10 with the antenna in an in-use vertical position, an inactive position, and a closed position, respectively.
Figure 20B:
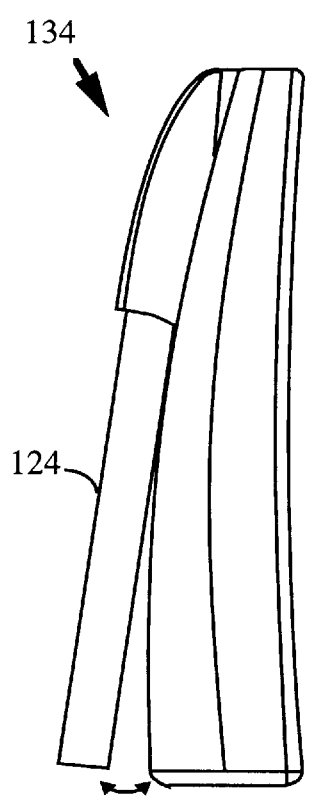
Figure 20C:
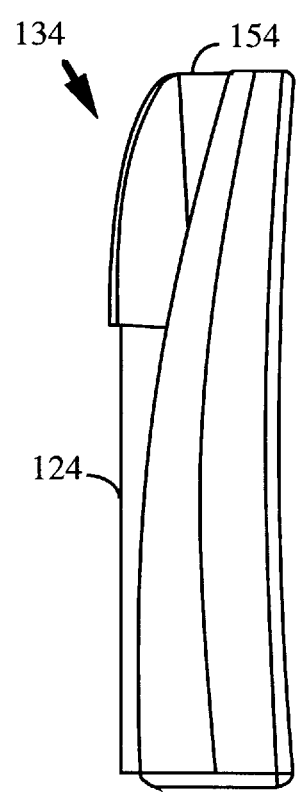

As before, the shape and dimensions of recess 136 substantially match those of antenna module 134, so that in a closed position, as shown in FIG. 20(c) module 134 is substantially flush with adjacent surfaces of the handset. An elongated recess 144 extending along a central position of rear wall 114 receives antenna 124 when not in use, as illustrated in FIGS. 12, 13, and 20(a)–(c). In the illustrated embodiment, recess 136 is generally circular in shape with a flat inner wall 146 (FIG. 14) and a curved side wall or surface 148. In this embodiment, wall 148 is circular with a height that decreases adjacent to side walls 120 and 122, and additionally adjacent upper wall 118. Upper wall 118 of the handset is of similar circular shape to side wall 148 of the recess.

As stated above, antenna module 134 and recess 136 are of substantially matching shape and dimensions, selected to permit antenna module 134 to pivot freely about pivot axis 140. The shape of antenna module 134 preferably matches the shape of adjacent surfaces of the phone housing for aesthetics. In this example, antenna module 134 is generally circular in shape with a circular outer side wall 150 curved to approximately match the curve of upper wall 118 or recess side wall 148. In addition, the profile of antenna module 134 is generally adjusted to be as thin as possible, especially toward outer edges, so that it extends very little above the general lines of rear handset surface 114. The outer wall of antenna module 134 may employ ridges or fins 159, in a manner discussed above for heat dissipation.

Antenna module 134 is mounted in recess 136 in a manner that provides a gimbaled structure which allows rotation about two pivot axis that are perpendicular to each other, allowing vertical antenna alignment relative to two axis. This is accomplished by mounting antenna module 134 on a support plate 154 which is mounted within recess 136. By securing antenna module 134 to support plate 154 using a first pivot joint 138 which allows rotation about a first axis and securing support plate 154 in recess 136 using a second pivot joint that allows rotation about a second axis, a very stable multi-axis gimbal type support is obtained. This mounting structure is illustrated in FIGS. 13, 14, and 15, and resulting operation in FIGS. 19 and 20.

Figure 13:
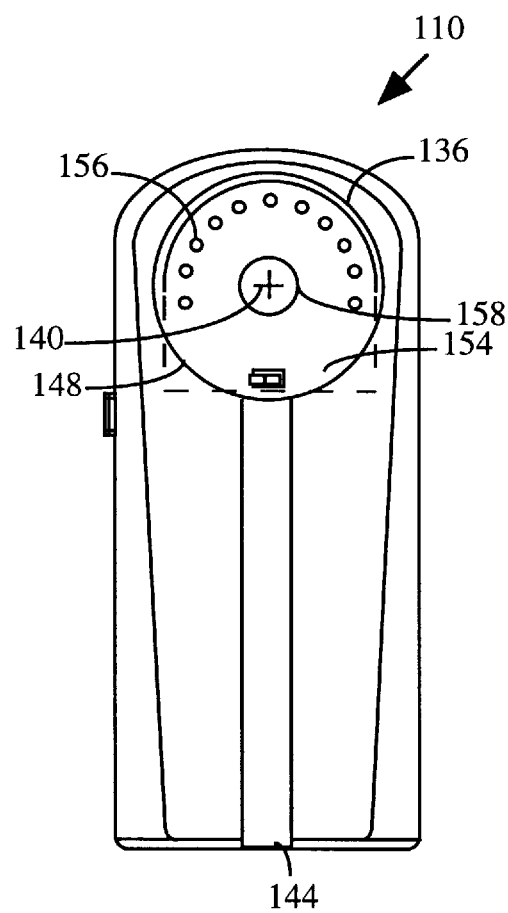
FIG. 13 illustrates a rear view of the handset of FIG. 10 with the antenna module removed.

In the rear view of FIG. 13, antenna module 134 has been removed from phone handset 110 and support plate 154 is visible in the bottom, or back, of recess 136. To provide stability and extra support, as well as a stop position, as desired, a portion of plate 154 in this embodiment extends into an undercut or recessed portion of rear wall 114 under wall 148. However, those skilled in the art will readily recognize this is not required and plate 154 can have a completely circular or other shape as desired for accommodation in recess 136.

Support plate 154 is shown having several spaced apart depressions, or projections or ridges 156, distributed along an arcuate path on an upper surface (196). These are used as part of a detent mechanism for establishing definitive positions for the antenna, as discussed below. A passage 158 is centrally located in plate 154 and is centered about pivot axis 140. Passage 158 is used for mounting antenna module 134 as shown in an exploded view in FIG. 14 and a side sectional view in FIG. 15.

Figure 14:
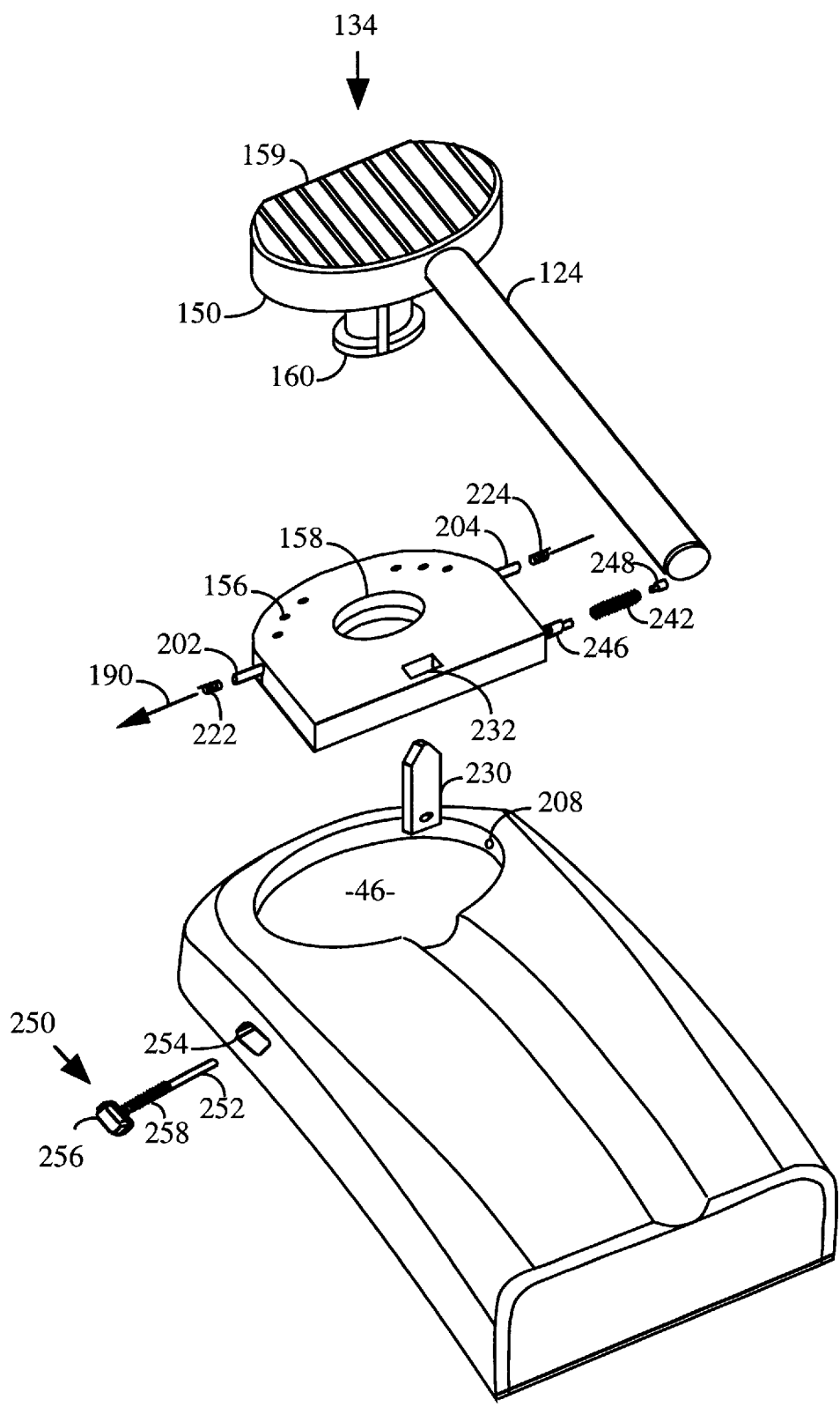
FIG. 14 illustrates a perspective exploded view of the handset of FIG. 10.
Figure 15:
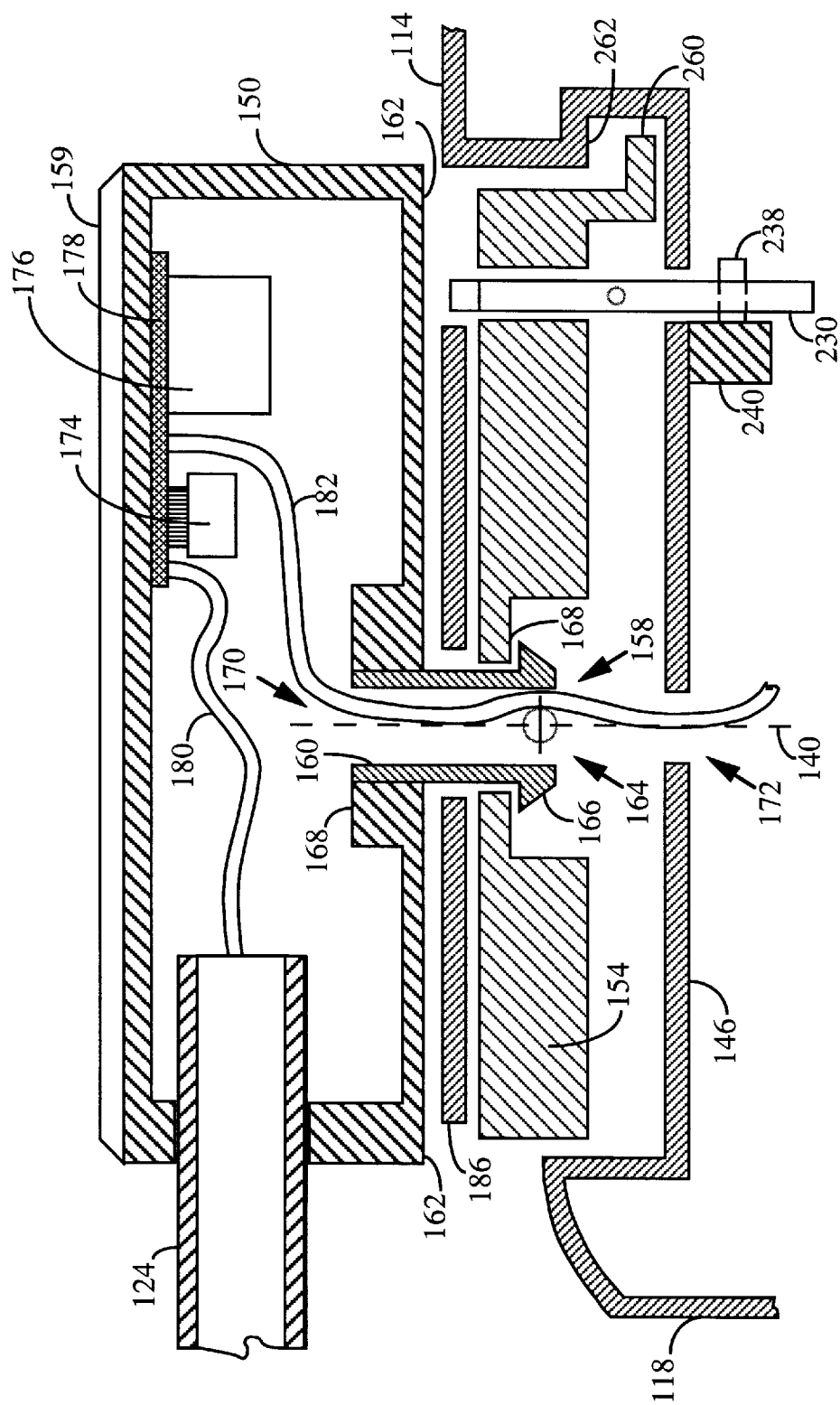
FIG. 15 illustrates a sectional view of the antenna module and support plate for the handset of FIG. 12 taken along line 15—15.

In FIGS. 14 and 15, antenna module 134 is shown mounted with a pivot joint 138 on support plate 154 within recess 136. Plate 154 serves to support module 134 as it rotates about pivot axis 140. Using a flat support plate with an area close to that of the base of antenna module 134 provides very stable support, and allows the use of self lubricating type washers or spacers to facilitate rotation of the antenna module while maintaining adequate environmental sealing for interior cavities.

Pivot joint 138 includes a pivot member or pin 160, which is secured approximately in the center of a flat inner wall 162 of antenna module 134. Pin 160 extends outward from wall 162 and engages passage 158 on plate 154. Pin 160 comprises any of a variety of known devices used to form rotating joints. In this embodiment, pin 160 is formed as a cylindrical member having an inner passage 164 surrounded by deformable sidewalls, typically achieved using a series of thin slots or gaps along the sidewall length to allow for deformation. A series of locking tabs 166, or a continuous lip, are formed at one end of pin 160 for engaging a recessed edge 168 around the periphery of passage 158 to hold the antenna module in place while allowing rotation.

Pin 160 can be secured in place on antenna module 134 for example by press fitting into a passage or opening 170 in wall 162 where thicker dimensions may be used to support the pin. Alternatively, other known mounting techniques can be used to secure pin 160 in place such as, adhesives, potting compounds, retaining rings or clips, or threaded surfaces, as would be apparent. Those skilled in the art will readily understand that other structures can also be used to implement this pivot joint and mounting. For example, the pins and bearing assemblies disclosed in the patents referenced above could also be used. The important feature is to construct a pivot joint that allows antenna module 134 to rotate about an axis that extends substantially perpendicular to the upper surface of support plate 154.

Inner passage or bore 164 of pin 160 is aligned with an opening 172 in wall 146 to provide a passage between the inside of antenna module 134 and the main body of the handset, where various conventional or known electronic components used to manufacture a portable telephone are located. Preferably, some of the electronic components used in the handheld telephone are mounted within antenna module 134, rather than in the handset. In the illustrated embodiment, RF components 174 and 176, which form parts of transmitter, receiver, low noise amplifier and power amplifier circuits, are shown being mounted on a circuit board 178 within antenna module 134. Other components for controlling and operating the telephone unit are mounted inside the handset, in a conventional manner. The antenna is connected to the components in the antenna module through a coaxial cable 180, and the RF components are in turn connected by coaxial cable 182 extending through bore 164 to the components in the handset.

Antenna 124 is secured to sidewall 150 on an upper portion of the antenna module. Antenna 124 can be secured in place using known techniques, such as but not limited to, press fitting, using adhesive compounds, set screws, retaining rings, or threaded surfaces. An annular shaped pad, ring, or washer 186 of material is disposed between antenna module 134 and wall 146 of recess 136. This material, discussed earlier, comprises any of a variety of well known low surface friction or self lubricating materials which provide support to antenna module 134 while presenting a low friction surface for rotation.

As discussed above, plate 154 is mounted within recess 136 in such a manner as to pivot about a second pivot axis that is perpendicular to the first pivot axis, 140. Plate 154 is typically configured to rock between a closed position substantially parallel to recess wall 146 and a position that is offset from parallel, or from another designated axis, by about 10 degrees. However, those skilled in the art will readily recognize that other angles, larger or smaller, can be used according to the design of handset 110 and the communication system involved. Alternative offset angles or rotations fall within the teachings of the present invention.

As shown in FIG. 14 and in the enlarged view of FIG. 16, a second pivot axis 190 extends through a central portion of plate 154 between sides 192 and 194. This axis is typically located centrally between upper and lower surfaces 196 and 198 of plate 154, however, for various manufacturing reasons, to use leverage, and so forth, this axis can be positioned off center, as desired. In addition, the thickness of plate 154 need not be uniform, and can be thicker along the pivot axis to accommodate pivot arms, while using a minimum of material elsewhere.

Two pivot arms 202 and 204 extend from sides 192 and 194, respectively, of plate 154, along pivot axis 190. These arms extend into matching mounting passages 206 and 208, respectively, in recess wall 148 which receive the arms and holds them in place during use. The dimensions of passages 206 and 208 are such that while they accommodate the arms and allow free rotation, they are not loose.

Arms 202 and 204 can be manufactured using several well known techniques and structures, some of which are illustrated in FIGS. 17(*a*)–17(*c*). As shown in FIG. 17(*a*), the arms can be formed as a unitary part of plate 154 when it is manufactured, such as by injection molding or machining from a single piece of material. Alternatively, as shown in 17(*b*), the arms can be formed by inserting pins 210 and 214 of appropriate dimension in depressions 212 and 216 formed in the sides of plate 154. In those situations where antenna module 134 is mounted on upper surface 196 of plate 154 without using a passage 158, or axis 190 is offset from passage 158, an axle 218 and be inserted through a passage 219 in plate 154 as shown in FIG. 17(*c*).

To provide a motivating force for plate 154 to move or re-orient itself relative to second pivot axis 190, a pair of torsion springs 222 and 224 are used. Torsion springs 222 and 224 are positioned around arms 202 and 204, respectively, and have ends or end tabs that interact with passages (203, 205) in the sides of plate 154 and recess 126. The ends of springs 222 and 224 are fixed in these depressions relative to central portions of the springs. If the springs are coiled, or uncoiled, from a 'relaxed' state before being fixed in place, and the fixed location of the ends of the springs are not aligned with the relaxed state, a torsional force is exerted by the body of springs 222 and 224. This causes the spring ends fixed to plate 154 to push against plate 154 and causes it to rotate about pivot axis 190.

Figure 18:
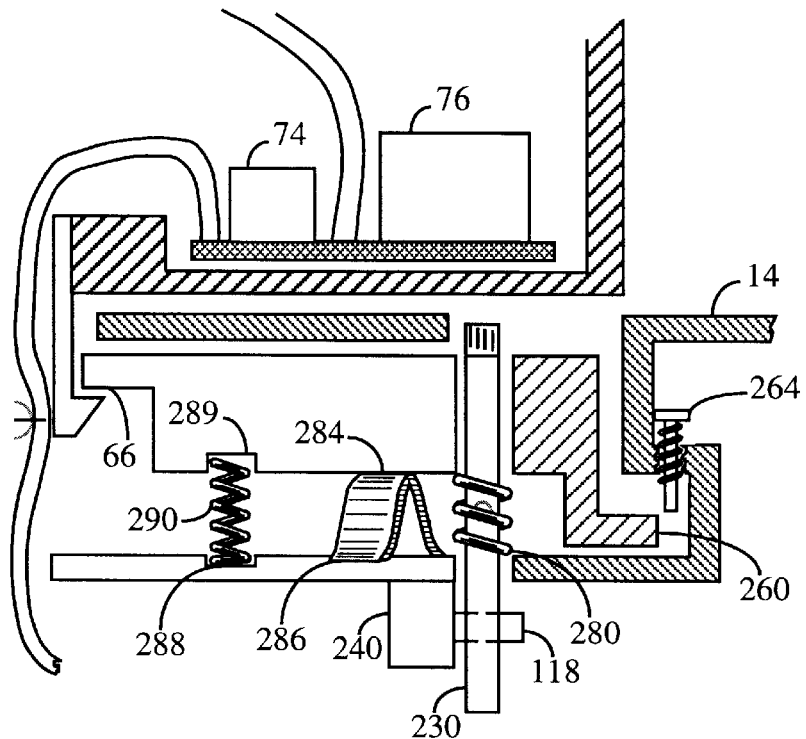
FIG. 18 illustrates alternative spring mechanisms useful in the assembly of FIG. 16.
Figure 19:
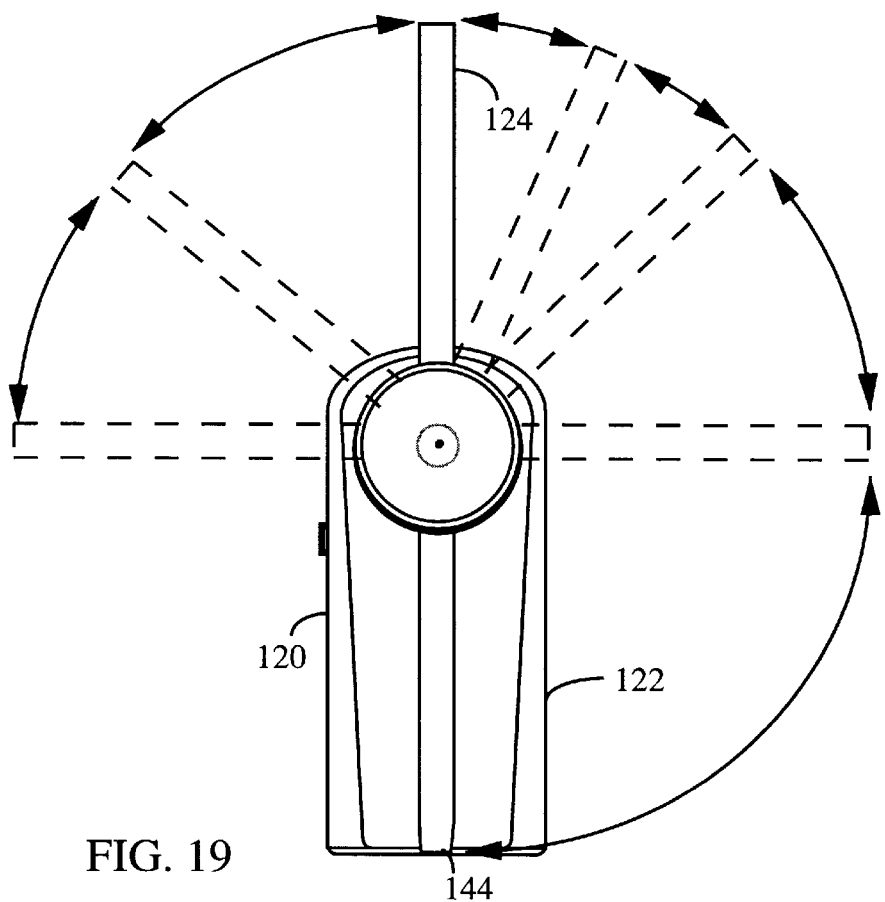
FIG. 19 illustrates a rear view of the handset of FIG. 10 showing several optional positions for the antenna.

Alternate embodiments for application of a biasing force for moving plate 154 about pivot axis 190 are shown in FIG. 18. In FIG. 18, the spring force can be supplied by one or more coil 290, 280 or leaf springs 284 placed between recess 126, wall 146, and plate 154 near one edge. In FIG. 18, one coil sprig is shown mounted around latch pin 230. Small depressions 286, 288, 289 in the bottom of the plate and in wall 146 receive the ends of the springs. Alternatively, a circular leaf spring could be mounted coaxially about pin 160, or one or more leaf type springs could be mounted under plate 154, again using recesses in plate 154 or wall 146 for positioning.

A mechanism is used to lock plate 154 in place when the phone handset is not in use, and to release plate 154 for travel to the designated angular offset or position, when the antenna is placed in an operational mode. This can be done by extending a latch arm 230 through a latch passage 232 in plate 154, as shown in FIGS. 16(*a*) and 16(*b*). Latch arm 230 is shaped so that one end has a notch 234 for engaging top surface 196 of plate 154, or a recessed edge in plate 154. An opposite end of latch arm 230 has a passage 236 for pivotally mounting the latch arm in handset 110. This mounting can use a pin 238 or similar means to secure the arm in place, for example using a support block 240 under wall 146, as shown in FIG. 14.

A spring 242 mounted in a passage 244 presses a plug, small rod, or pin 246 against arm 230 from one side of plate 154 to force latch arm 230 to rotate about pin 236. The top 235 of latch arm 230 is beveled, slanted, or otherwise narrower at the top. This means that the top of latch arm 230 is deflected sideways, and the arm rotates one direction about pin 216 when plate 154 is pressed down over latch arm 230. The force of spring 242 then pushes latch arm 230 sideways and causes notch 234 to extend over the surface of plate 154 once it clears the opening of latch passage 232.

In order to release plate 154 and allow springs 222 and 224 to rotate the plate about pivot axis 190 to a desired offset angle, a release mechanism 250 is provided on another side of handset 110 and plate 154. Release mechanism 250 uses a release rod or pin 252 extending through a passage 254 in side wall 122 of handset 110. A button or cap 256 on pin 252, provides a surface for manual activation of the release pin by a phone user. A spring 258 automatically withdraws pin 252 to the outer edge of the phone handset and allows latching of plate 154 in position when it is again pressed downward. However, in alternative embodiments, a ball and socket type of detent mechanism may be provided between module 134 and recess 136, or other mechanisms known in the art such as a snap lock finger or latch at the lower end of recess 144 which interacts with the antenna. In this configuration, hand pressure on upper wall 150 of the antenna module might be used to release antenna 124 from recess 144.

When plate 154 is released and rotated by springs 222 and 224 about pivot axis 190, it stops at a preselected angle of rotation which places top surface 196 at a desired angle with respect to a predefined handset axis, as discussed below. The angle at which plate 154 stops rotating can be determined using a number of different techniques known in the art. Plate 154 could be allowed to rotate until it strikes wall 146 or an overhanging portion of rear wall 114. However, in the present embodiment a tab 260 is formed on one side of plate 154 as shown in FIG. 15. Tab 260 interacts with a notch or stop surface 262 formed in wall 148 to stop the rotation of plate 154. If adjustment is desired, a set screw 264 could be positioned in wall 148 to interact with tab 260, as shown in FIG. 18. A typical range for the offset angle for plate 154 is around 7°–12°, as discussed above.

With the type of mounting disclosed above, antenna module 134 can rotate freely providing an ability to correct or adjust the antenna vertical orientation about one axis of rotation, 140. That is, a handset user can rotate the antenna to a desired vertical position for use, which improves communications. Various positions for antenna 124 relative to handset 110 are shown in the rear view of FIG. 19. Typically, antenna 124 need not rotate any farther than shown on the left side of FIG. 19, and a stop mechanism (not shown) may be used to prevent further counter-clockwise rotation.

Rotation of antenna module 134 in recess 136 on handset 110 using the above embodiment of the present invention is also shown in the side views of FIGS. 20(a), 20(b), and 20(c). Here, the antenna is shown rotated to a vertical in-use position, a vertical inactive position, and a closed position, respectively. In the vertical in-use position of FIG. 20(a), a central axis 272 of antenna 124 is positioned at an intersecting angle to a predefined handset axis 270. In this example axis 270 extends through speaker 128 and microphone 126, although other axis could be used for orientation purposes. In the inactive position, antenna 124 is positioned above or aligned with recess 144 but plate 154 is still rotated to an offset angle. Therefore, antenna 124 extends at an angle to rear wall 114 and recess 144. In the closed position, plate 154 is rotated to be parallel with the desired axis, such as handset axis 270, and antenna 124 rests within recess 144 on rear wall 114.

Since the invention assures that the antenna or antennas have a reasonably vertical orientation, the radiation pattern used can be optimized to have a more vertical pattern. This results in more efficient signal energy transfer and improved communication system performance.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. For example, this technique is useful for advanced non-satellite wireless systems as well. Thus, the present invention is not intended to be limited to the embodiments shown herein but is to be accorded the widest scope consistent with the principles and novel features disclosed herein.

What we claim is:

1. Antenna support apparatus for a portable wireless communications device, comprising:
    a support plate pivotally secured to said wireless communications device with a pivot joint for rotation about a first predefined pivot axis with at least one planar support surface which rotates about said first pivot axis;
    an antenna module pivotally secured to the support plate with a pivot joint for rotation about a predefined second pivot axis which is perpendicular to the first for placing the module in predetermined orientations about said second axis, independent of handset orientation; and
    bias means for urging said support plate to rotate about said first pivot axis so as to provide at least one desired offset in vertical orientation of said first axis about said second axis.

2. The support apparatus of claim 1 wherein said offset is at a preselected angle in the range of 6–16 degrees.

3. The support apparatus of claim 2 wherein said preselected angle is in about 10 degrees.

4. The support apparatus of claim 1 further comprising releasable locking means for releasably securing said plate in a substantially stationary position when said antenna is not in a deployed position.

5. The support apparatus of claim 4 wherein said releasable locking means comprises:
    at least one latch arm extending toward said plate from said wireless device, having a notch adjacent an end near said plate for engaging a catch; and
    a catch secured to said plate.

6. The support apparatus of claim 5 wherein said latch arm is pivotally mounted near a base end opposite said notch so that it can rotate about the base end, said releasable locking means further comprising:
    a catch secured to said plate.

7. The support apparatus of claim 5 further comprising a release arm movably mounted on said wireless device, and positioned to engage a side of said latch arm, so as to rotate said arm when pressure is applied to said release arm, and said notch disengages said catch.

8. The support apparatus of claim 5 further comprising a spring element disposed about said release arm so as to bias said arm away from contact with said latch arm until pressure is applied to said release arm.

9. The support apparatus of claim 5 wherein said support plate has a passage through which one end of said latch arm extends, being the end with said notch, for engaging said notch when said plate is to be secured in a fixed position.

10. The support apparatus of claim 1 wherein said support plate is mounted within a recess in a back wall of said device which has side walls that extend completely around a peripheral edge of said support plate.

11. The support apparatus of claim 1 wherein said device is a handheld wireless telephone.

12. The support apparatus of claim 1 wherein said antenna is configured for dual frequency operation in different frequency bands and transfer of communication signals using a satellite.

13. The support apparatus of claim 1 further comprising an antenna mounted on said antenna module projecting radially outward from said second pivot axis and in a plane substantially parallel to said first pivot axis, oriented vertically when said module is in said predetermined orientations.

14. The support apparatus of claim 1 wherein said support plate comprises two opposing substantially flat surfaces, one for receiving said antenna module in a central location, and at least one connecting side edge.

15. The support apparatus of claim 14 wherein said pivot joint comprises a pair of pivot arms extending from the side edge on opposite sides of said plate along said first axis.

16. The support apparatus of claim 15 wherein said support plate is mounted within a recess in a back wall of said wireless device which has side walls that extend completely around a peripheral edge of said support plate, and said arms extend into recesses therein.

17. The support apparatus of claim 15 wherein said arms comprise cylindrical tabs formed integral with said plate.

18. The support apparatus of claim 15 wherein each said arm comprises a pin inserted within a passage.

19. The support apparatus of claim 15 wherein said arms comprise opposite ends of an axle extending through said plate from one side to another.

20. The support apparatus of claim 15 wherein said bias means comprises at least one torsion spring disposed concentrically about each of said arms, with one end attached to said plate and an opposing end exerting a force against a portion of said wireless device.

21. The support apparatus of claim 1 wherein said bias means comprises at least one spring element disposed between said support plate and said wireless device, offset a predetermined distance from said first axis.

22. The support apparatus of claim 21 wherein said spring element comprises a coil type spring.

23. The support apparatus of claim 21 wherein said spring element comprises a leaf type spring.

24. The support apparatus of claim 1 wherein said bias means comprises at least one compressible resilient element disposed between said support plate and said wireless device, offset a predetermined distance from said first axis.

25. The support apparatus of claim 1 wherein said antenna module comprises a pivot pin secured to said support plate in a central location of a first surface.

26. The support apparatus of claim 1 wherein the antenna module is rotatable about said pivot axis from an inoperative, stored position in which the antenna is located in a recess for receiving said antenna in a central portion of a back of said wireless device, into said orientations relative to said device.

27. The support apparatus of claim 1 further comprising at least one rotation stop element disposed between said plate and said wireless device to establish a stopping point for rotation of said plate about said first axis.

28. The support apparatus of claim 1 wherein said rotation stop element comprises a set screw.

29. The support apparatus of claim 1 wherein said rotation stop element comprises a tab extending laterally from said support plate.

30. The support apparatus of claim 1 further comprising a plurality of detents positioned in an arcuate patch on a surface of said plate facing said antenna module for interacting therewith to impede rotation thereof when certain preselected positions are obtained.

31. The support apparatus of claim 1 wherein said wireless device has a recess for receiving said antenna in said stored position.

* * * * *